United States Patent
Li et al.

(10) Patent No.: US 12,174,917 B2
(45) Date of Patent: Dec. 24, 2024

(54) DATA PROCESSING METHOD

(71) Applicant: BEIJING BAIDU NETCOM SCIENCE TECHNOLOGY CO., LTD., Beijing (CN)

(72) Inventors: Shuo Li, Beijing (CN); Hanchenxi Xu, Beijing (CN); Juyan Zhang, Beijing (CN); Hongda Yue, Beijing (CN); Haiyang Xu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/169,806

(22) Filed: Feb. 15, 2023

(65) Prior Publication Data

US 2023/0195849 A1    Jun. 22, 2023

(30) Foreign Application Priority Data

Feb. 18, 2022   (CN) .......................... 202210153080.9

(51) Int. Cl.
  *G06F 16/00*    (2019.01)
  *G06F 16/23*    (2019.01)
  *G06F 18/22*    (2023.01)

(52) U.S. Cl.
  CPC ............. *G06F 18/22* (2023.01); *G06F 16/23* (2019.01)

(58) Field of Classification Search
  CPC ........ G06F 18/22; G06F 16/23; G06F 16/252; G06F 16/2465
  See application file for complete search history.

(56) References Cited

U.S. PATENT DOCUMENTS 9,064,491 B2 * 6/2015 Rachevsky ............ G06N 20/10
2021/0390266 A1   12/2021 Zhang et al.

FOREIGN PATENT DOCUMENTS

| CN | 111460264 A |   | 7/2020 |
| CN | 111859987 A |   | 10/2020 |
| CN | 111859997 A |   | 10/2020 |
| CN | 112541515 A |   | 3/2021 |
| CN | 113239176 A |   | 8/2021 |
| CN | 113435499 A |   | 9/2021 |
| CN | 113609918 A | * | 11/2021 |
| CN | 113704531 A |   | 11/2021 |
| CN | 113902135 A |   | 1/2022 |
| CN | 114444720 A | * | 5/2022 |
| WO | 2020107835 A1 |   | 6/2020 |

(Continued)

OTHER PUBLICATIONS

Extended European Patent Search issued in the related European Patent Appl. No. 23155322.3, mailed Jun. 30, 2023, 8 pages.

(Continued)

*Primary Examiner* — Alexander Khong
(74) *Attorney, Agent, or Firm* — FisherBroyles, LLP (57) ABSTRACT

A data processing method is provided. The method includes: obtaining a sample data set for modeling; selecting a first sample data from the sample data set; generating, in response to determining that a similarity between a first semantic vector corresponding to a first feature dimension and a second semantic vector corresponding, to a second feature dimension meets a preset condition, a second sample data based on the first sample data; and adding the second sample data to the sample data set.

15 Claims, 5 Drawing Sheets

(56) References Cited

FOREIGN PATENT DOCUMENTS

| WO | WO-2021121127 A1 * | 6/2021 | ............ G06F 40/30 |
| WO | 2021217930 A1 | 11/2021 | |

OTHER PUBLICATIONS

Dehouck Mathieu, et al., "Data Augmentation via Subtree Swapping for Dependency Parsing of Low-Resource Languages", Proceedings of the 28th International Conference on Computational Linguistics, Dec. 13, 2020, pp. 3818-3830.

Lun Jiaqi, et al., "Multiple Data Augmentation Strategies for Improving Performance on Automatic Short Answer Scoring", Proceedings of the AAAI Conference on Artificial Intelligence, vol. 34, No. 09, 2020, pp. 13446-13453.

Sonia Castelo, et al., "Auctus: A Dataset 1-15 Search Engine for Data Augmentation", arxiv.org, Cornell University Library, 201 Olin Library Cornell University Ithaca, NY 14853, Aug. 31, 2021, XP091025819, pp. 1-4.

Zhang Lianbo, et al., "Intra-class Part Swapping for Fine-Grained Image Classification", 2021 IEEE Winter Conference On Applications of Computer Vision (WACV), IEEE, Jan. 3, 2021, pp. 3208-3217.

Pan Chongyu et al., "Survey of weakly supervised learning integrating zero-shot and few-shot learning", Systems Engineering and Electronics, Changsha, China, Oct. 13, 2020, vol. 42, No. 10, 11 pages.

Tian Feng et al., "Image semantic annotation method for weakly labeled dataset", Ruan Jian Xue Bao/Journal of Software, 2013, vol. 24, No. 10, 14 pages; http://www.jos.org.cn/1000-9825/4424.htm.

First Office Action of the counterpart CN application No. 202210153080.9, Official mailing mate: Mar. 6, 2024, 18 pages.

Second Office Action of the counterpart CN application No. 202210153080.9, official mailing mate: Jul. 18, 2024, 10 pages.

Li Lixiang et al., "Chaos Ant Colony Algorithm and Its Applications", China Science and Technology Publishing House, Jan. 31, 2013, 9 pages.

* cited by examiner

| | Feature | | | | | Label | Enhancement manner |
|---|---|---|---|---|---|---|---|
| Real sample | Search App 1 | Shopping App 1 | Crowdsourcing App 1 | Loan App 1 | Guide App 1 | ...... | Label 1 | |
| Augmented sample 1 | Search App 1 | Shopping App 2 | Crowdsourcing App 1 | Loan App 1 | Guide App 1 | ...... | Label 1 | Replacement |
| Augmented sample 2 | Search App 1 | Shopping App 1 | Crowdsourcing App 1 | Loan App 1 | Guide App 1 | Guide App 2 | Label 1 | Add |
| Augmented sample 3 | Search App 1 | Shopping App 1 | Crowdsourcing App 1 | Loan App 1 | Guide App 1 | ...... | Label 1 | Mask |
| Augmented sample 4 | Search App 1 | Shopping App 1 | Crowdsourcing App 2 | Loan App 2 | Guide App 1 | ...... | Label 1 | Replacement |

DATA PROCESSING METHOD

CROSS REFERENCE TO RELATED APPLICATION

This application claims priority to Chinese patent application No. 202210153080.9 filed on Feb. 18, 2022, the contents of which are hereby incorporated by reference in their entirety for all purposes.

TECHNICAL FIELD

The present disclosure relates to the technical field of computers, in particular to the fields of artificial intelligence, data mining and machine learning, and in particular to a data processing method, an electronic device, and a computer-readable storage medium

BACKGROUND

Machine learning is a science of artificial intelligence. The main research object in this field is artificial intelligence, especially how to improve the performance of specific algorithms in empirical learning. It is mainly divided into supervised learning, unsupervised learning and reinforcement teaming. Among them, supervised learning is a machine learning task of inferring functions from a labeled training dataset. Data augmentation can generate more augmented data based on limited sample data, thereby increasing the number and diversity of training samples and improving model robustness.

Methods described in this section are not necessarily those previously envisaged or adopted. Unless otherwise specified, it should not be assumed that any method described in this section is considered the prior art only because it is included in this section. Similarly, unless otherwise specified, the issues raised in this section should not be considered to have been universally acknowledged in any prior art.

SUMMARY

The present disclosure provides a data processing method, an electronic device, and a computer-readable storage medium.

According to one aspect of the present disclosure, a data processing method is provided, including: obtaining a sample data set for modeling, wherein each piece of sample data in the sample data set at least comprises a first feature dimension and a second feature dimension; selecting a first sample data from the sample data set, wherein a feature value of the first feature dimension of the first sample data is a first value, and the feature values of the second feature dimension of the first sample data is a second value; generating, in response to determining that a similarity between a first semantic vector corresponding to the first feature dimension and a second semantic vector corresponding to the second feature dimension meets a preset condition, a second sample data based on the first sample data, wherein the feature value of the second feature dimension of the second sample data is the first value, and wherein the second sample data and the first sample data have a same sample label; and adding the second sample data to the sample data set.

According to another aspect of the present disclosure, an electronic device is provided, including: one or more processors; and a memory storing one or more programs configured to be executed by the one or more processors, the one or more programs comprising instructions for performing operations comprising: obtaining a sample data set for modeling, wherein each piece of sample data in the sample data set at least comprises a first feature dimension and a second feature dimension; selecting a first sample data from the sample data set, wherein a feature value of the first feature dimension of the first sample data is a first value, and the feature values of the second feature dimension of the first sample data is a second value; generating, in response to determining that a similarity between a first semantic vector corresponding to the first feature dimension and a second semantic vector corresponding to the second feature dimension meets a preset condition, a second sample data based on the first sample data, wherein the feature value of the second feature dimension of the second sample data is the first value, and wherein the second sample data and the first sample data have a same sample label; and adding the second sample data to the sample data set.

According to yet another aspect of the present disclosure, a non-transitory computer-readable storage medium storing one or more programs comprising instructions that, when executed by one or more processors of a computing device, cause the computing device to perform operations comprising: obtaining a sample data set for modeling, wherein each piece of sample data in the sample data set at least comprises a first feature dimension and a second feature dimension; selecting a first sample data from the sample data set, wherein a feature value of the first feature dimension of the first sample data is a first value, and the feature values of the second feature dimension of the first sample data is a second value; generating, in response to determining that a similarity between a first semantic vector corresponding to the first feature dimension and a second semantic vector corresponding to the second feature dimension meets a preset condition, a second sample data based on the first sample data, wherein the feature value of the second feature dimension of the second sample data is the first value, and wherein the second sample data and the first sample data have a same sample label and adding the second sample data to the sample data set.

It should be understood that the content described in this part is not intended to identify key or important features of the embodiments of the present disclosure, nor is it used to limit the scope of the present disclosure. Other features of the present disclosure will be easily understood by the following description.

BRIEF DESCRIPTIONS OF DRAWINGS

The accompanying drawings illustrate the embodiments by way of example and constitute a part of the specification, and together with the written description of the specification serve to explain exemplary implementations of the embodiments. The illustrated embodiments are for illustrative purposes only and do not limit the scope of the claims. Throughout the drawings, the same reference numerals refer to similar but not necessarily identical elements.

DETAILED DESCRIPTION OF THE EMBODIMENTS

The embodiments of the present disclosure are described below with reference to the accompanying drawings, including various details of the embodiments of the present disclosure to facilitate understanding, which should be considered merely example. Therefore, those of ordinary skill in the art should recognize that various changes and modifications may be made to the embodiments described herein without departing from the scope of the present disclosure. Similarly, for clarity and conciseness, the description of well-known functions and structures is omitted from the following description.

In the present disclosure, unless otherwise specified, the terms "first", "second" and the like are used to describe various elements and are not intended to limit the positional relationship, temporal relationship or importance relationship of these elements. These terms are only used to distinguish one element from another element. In some examples, a first element and a second element may refer to the same instance of the element, and in some cases, based on the context description, they can also refer to different instances.

The terms used in the description of the various examples in the present disclosure are only for the purpose of describing specific examples and are not intended to be limiting. Unless the context clearly indicates otherwise, if the number of elements is not specifically limited, the element may be one or more. In addition, the term "and/or" as used in the present disclosure covers any and all possible combinations of the listed items.

The embodiments of the present disclosure will be described in detail below with reference to the accompanying drawings.

Figure 1:
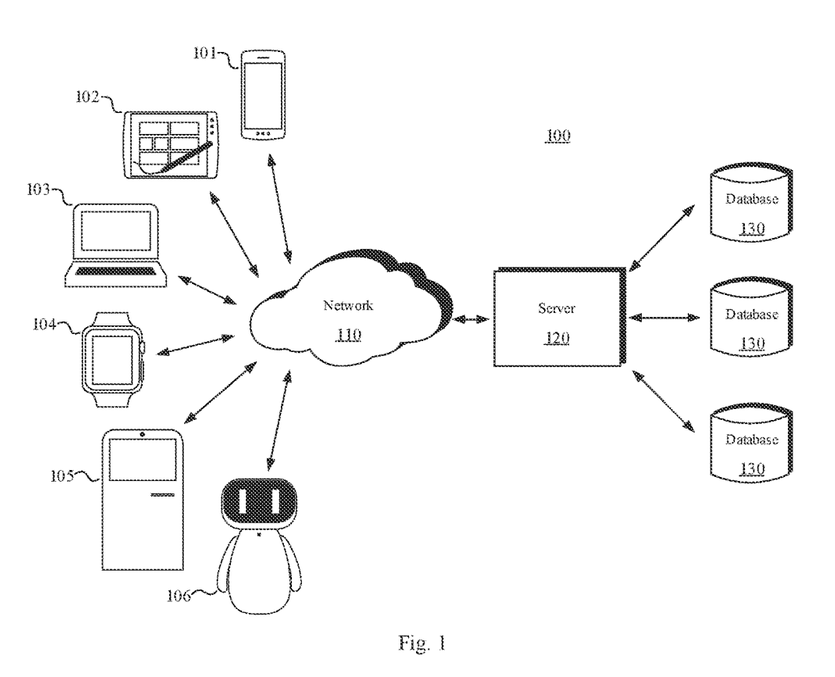
FIG. 1 shows a schematic diagram of an example system in which various methods described herein may be implemented, according to embodiments of the present disclosure.

FIG. 1 shows a schematic diagram of an example system 100 in which various methods and apparatuses described herein may be implemented according to embodiments of the present disclosure. Referring to FIG. 1, the system 100 includes one or more client devices 101, 102, 103, 104, 105 and 106, a server 120, and one or more communication networks 110 coupling the one or more client devices to the server 120. The client devices 101, 102, 103, 104, 105 and 106 may be configured to execute one or more applications.

In the embodiment of the present disclosure, the server 120 may run one or more services or software applications that enable the execution of a data processing method.

In certain embodiments, the server 120 may further provide other services or software applications that may include non-virtual environments and virtual environments. In certain embodiments, these services may be provided as web-based services or cloud services, such as being provided to users of the client devices 101, 102, 103, 104, 105 and/or 106 under a software as a service (SaaS) model.

In a configuration shown in FIG. 1, the server 120 may include one or more components implementing functions executed by the server 120. These components may include a software component, a hardware component or their combinations that may be executed by one or more processors. The users operating the client devices 101, 102, 103, 104, 105 and/or 106 may sequentially utilize one or more client applications to interact with the server 120 so as to utilize services provided by these components. It should be understood that various different system configurations are possible, which may be different from the system 100. Therefore, FIG. 1 is an example of a system for implementing the various methods described herein, and is not intended to be limiting.

The users may use the client devices 101, 102, 103, 104, 105 and/or 106 to upload sample data. The client devices may provide interfaces enabling the users of the client devices to be capable of interacting with the client devices. The client devices may further output information to the users via the interfaces. Although FIG. 1 only depicts six client devices, those skilled in the art can understand that the present disclosure may support any number of client devices.

The client devices 101, 102, 103, 104, 105 and/or 106 may include various types of computer devices, such as a portable handheld device, a general-purpose computer (such as a personal computer and a laptop computer), a workstation computer, a wearable device, a smart screen device, a self-service terminal device, a service robot, a gaming system, a thin client, various message transceiving devices, a sensor or other sensing devices, etc. These computer devices may run various types and versions of software applications and operating systems, such as MICROSOFT Windows, APPLE iOS, UNIX-like operating systems, and Linux or Linux-like operating systems (such as GOOGLE Chrome OS); or include various mobile operating systems, such as MICROSOFT Windows Mobile OS, iOS, Windows Phone and Android. The portable handheld device may include a cell phone, a smart phone, a tablet computer, a personal digital assistant (PDA) and the like. The wearable device may include a head-mounted display (such as smart glasses) and other devices. The gaming system may include various handheld gaming devices, gaming devices supporting the Internet and the like. The client devices can execute various different applications, such as various Internet-related applications, communication applications (such as e-mail applications), and short message service (SMS) applications, and may use various communication protocols.

The network 110 may be any type of network well known to those skilled in the art, which may use any one of various available protocols (including but not limited to TCP/IP, SNA, IPX, etc.) to support data communication. Only as examples, one or more networks 110 may be a local area network (LAN), an Ethernet-based network, a token ring, a wide area network (WAN), the Internet, a virtual network, a virtual private network (VPN), intranet, an external network, a public switched telephone network (PSTN), an infrared network, a wireless network (e.g., Bluetooth, WIFI), and/or any combination of these and/or other networks.

The server 120 may include one or more general-purpose computers, dedicated server computers (e.g., personal computer (PC) servers, UNIX servers, and midrange servers), blade servers, mainframe computers, server clusters, or any other suitable arrangement and/or combination. The server 120 may include one or more virtual machines running virtual operating systems, or other computing frameworks involving virtualization (e.g., one or more flexible pools of logical storage devices that may be virtualized to maintain virtual storage devices of the server). In various embodiments, the server 120 may run one or more services or software applications providing the functions described below.

A computing unit in the server 120 may run one or more operating systems including any above operating system and any commercially available server operating system. The server 120 may further run any one of various additional server applications and/or intermediate layer applications, including an HTTP server, an FTP server, a CGI server, a JAVA server, a database server and the like.

In some implementations, the server 120 may include one or more applications to analyze and combine data feed and/or event updating received from the users of the client devices 101, 102, 103, 104, 105 and 106. The server 120 may further include one or more applications to display data feed and/or real-time events via one or more display devices of the client devices 101, 102, 103, 104, 105 and 106.

In some implementations, the server 120 may be a server of a distributed system, or a server combined with a block chain. The server 120 may further be a cloud server, or a smart cloud computing server or smart cloud host with the artificial intelligence technology. The cloud server is a host product in a cloud computing service system to solve the defects of large management difficulty and weak business expansibility in traditional physical host and virtual private server (VPS) services.

The system 100 may further include one or more databases 130. In certain embodiments, these databases may be used to store data and other information. For example, one or more of the databases 130 may be used to store, for example, information of audio files and video files. The databases 130 may reside at various positions. For example, a data storage base used by the server 120 may be local to the server 120 or may be away from the server 120 and may communicate with the server 120 via and based on a network or specific connection. The databases 130 may be of different types. In certain embodiments, the data storage base used by the server 120 may be a database, such as a relational database. One or more of these databases may respond to a command to store, update and retrieve data to and from the databases.

In certain embodiments, one or more of the databases 130 may further be used by applications to store application data. The databases used by the applications may be different types of databases, such as a key value storage base, an object storage base or a conventional storage base supported by a file system.

The system 100 of FIG. 1 may be configured and operated in various modes so that various methods and apparatuses described according to the present disclosure can be applied.

In the field of machine learning, there are often many scenarios where a sample data set used to train a model has few labeled sample data and the sample data distribution is unbalanced. For example, in a credit risk control scenario in user behavior modeling, the number of positive samples with overdue credit labels is often much smaller than the number of negative samples with non-overdue labels. For example, the ratio of positive and negative samples may reach 1:100 or even 1:1000. Therefore, when such sample data with small number and unbalanced distribution are used for model training, the obtained model often has problems such as serious overfitting and poor robustness, and the effect of modeling is difficult to improve.

Figure 2:
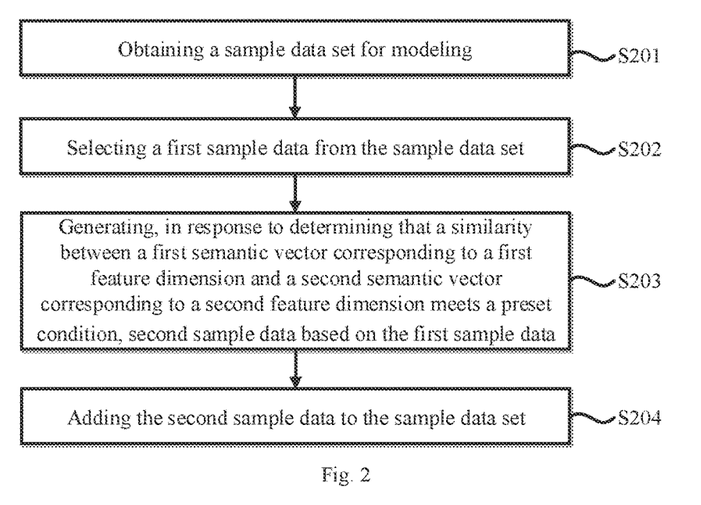
FIG. 2 shows a flowchart of a data processing method according to some embodiments of the present disclosure.

According to some embodiments of the present disclosure, as shown in FIG. 2, a data processing method is provided. The data processing method includes: step S201, a sample data set for modeling is obtained, where each piece of sample data in the sample data set at least includes a first feature dimension and a second feature dimension; step S202, a first sample data is selected from the sample data set, where feature value of the first feature dimension of the first sample data is first value, and feature value of the second feature dimension of the first sample data is second value; step S203, in response to determining that a similarity between a first semantic vector corresponding to the first feature dimension and a second semantic vector corresponding to the second feature dimension meets a preset condition, a second sample data is generated based on the first sample data, where the feature value of the second feature dimension of the second sample data is the first value, and where the second sample data and the first sample data have the same sample label; and step S204, the second sample data is added to the sample data set.

Through the embodiment of the present disclosure, by replacing corresponding features in the sample data with semantically similar features or adding the semantically similar features to generate augmented samples, and adding the augmented samples to the original sample data set, the sample size of the sample data set for modeling is increased.

In some scenarios, sample data for model training are high-dimensional sparse data, such as user behavior modeling scenarios. High-dimensional sparse data often have hundreds of thousands or even millions of dimensions, but only hundreds of dimensions with feature representation.

In some embodiments, the sample data set for modeling may be a user behavior sample data set for user behavior modeling, in which sample data are all high-dimensional sparse user behavior data. User behavior data are usually a fixed-length structured vector. Each position of the vector represents a feature dimension of a user behavior feature, and each feature dimension has a feature value that represents a specific meaning. For example, if the feature value corresponding to a feature dimension is 1, it may indicate that the user has the feature; on the contrary, if the feature value corresponding to the feature dimension is 0, it may indicate that the user does not have the feature. It can be understood that "1" and "0" in the above examples are only examples of a first value and a second value in the present disclosure, and other binary value examples are also conceivable, which are not limited in the present disclosure.

Generally, each piece of user behavior data has hundreds of thousands of feature dimensions, but due to the large differences in feature dimensions such as user interest attributes, most users have very few feature dimensions. Only a few hundred feature dimensions have the first values, and the rest of the feature dimensions have the second values.

In some embodiments, the augmented samples may be generated by replacing a first feature dimension with a second feature dimension having similar semantics to the first feature dimension. Specifically, for the first feature dimension with a value and the second feature dimension with a second value in the sample data, since the first feature dimension and the second feature dimension have similar semantics, the value of the second feature dimension is set to the first value, the value of the first feature dimension is set to the second value, and values of other feature dimensions of the first sample data and the label corresponding, to the first sample data are kept unchanged, so that the augmented samples, that is, the second sample data are obtained.

Figure 3:
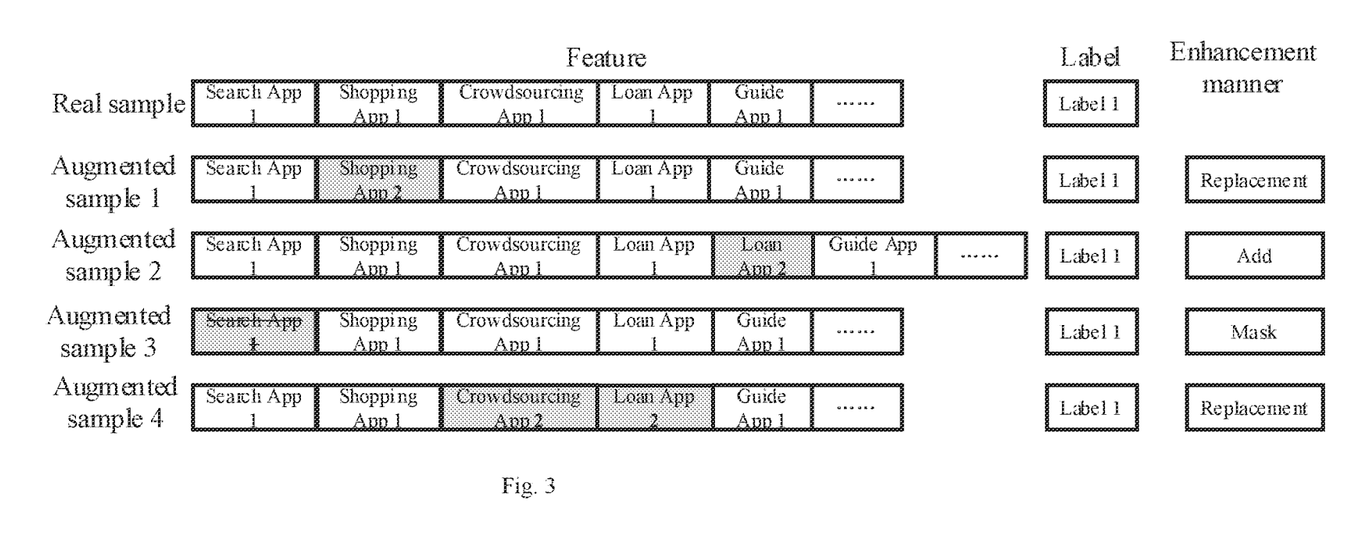
FIG. 3 shows an example of a data processing method according to some embodiments of the present disclosure.

FIG. 3 shows an example of obtaining augmented samples through an enhancement manner of replacement. As shown in an augmented sample 1 in FIG. 3, in a real sample, a sample user has installed Shopping App 1 but not installed Shopping App 2, that is, "Shopping App 1" is the first feature dimension in the sample data, "Shopping App 2" is the second feature dimension in the sample data, and "Shopping App 1" and "Shopping App 2" are semantically similar. To generate the augmented sample by replacement, while keeping the sample label unchanged, the feature value of "Shopping App 1" may be set to be 0, the feature value of "Shopping App 2" may be set to be 1, and "Shopping App 1" may be replaced with "Shopping App 2" to obtain the augmented sample 1. As shown in an augmented sample 4 in FIG. 3, similarly, a plurality of first feature dimensions may also be replaced at the same time. For example, the augmented sample 4 is obtained by replacing "Crowdsourcing App 1" with "Crowdsourcing App 2" and replacing "Loan App 1" with "Loan App 2" at the same time.

Figure 4:
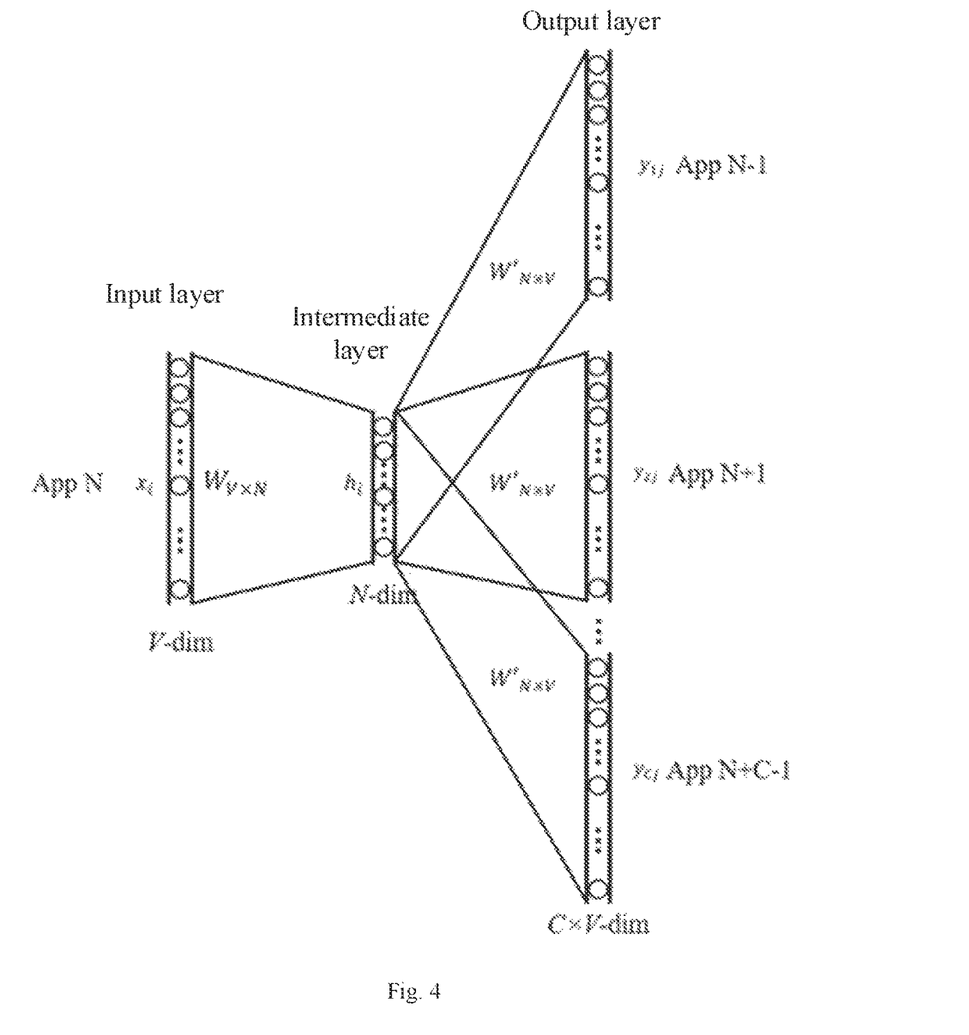
FIG. 4 shows a schematic diagram of an unsupervised semantic representation model according to some embodiments of the present disclosure.

In some embodiments, the second feature dimension having similar semantics to the first feature dimension may be obtained by using an unsupervised semantic representation model as shown in FIG. 4. Taking application software as an example, firstly, a model may be trained through an unlabeled feature data set of the application software, so that the model may express feature vectors input into the application software as corresponding semantic vectors through an input layer; a Euclidean distance between two semantic vectors is calculated through an intermediate layer, and a plurality of semantic vectors with Euclidean distances from the semantic vectors input into the application software being smaller than a preset threshold are obtained; and then application software feature vectors corresponding to the plurality of semantic vectors are obtained through an output layer.

Through the trained model, high-dimensional sparse feature vectors $x_i$ (the dimension V-dim may be, for example, 300,000 dimensions) corresponding to application software "App N" are input into the model; corresponding semantic representation vectors $h_i$ (dimension N-dim may be, for example, 64 dimensions) are obtained through the input layer ($W_{V \times N}$ is a parameter of the input layer), then a plurality of similar semantic representation vectors are obtained through the intermediate layer, and a plurality of corresponding feature vectors $y_{1j}, y_{2j}, \ldots, y_{Cj}$ having similar semantics to $x_i$ are obtained through the output layer ($W'_{N \times V}$ is a parameter of the output layer). C represents an arbitrary positive integer, and the feature vectors $y_{1j}, y_{2j}, \ldots, y_{Cj}$ correspond to application software "App N−1", "App N+1", ..., "App N+C−1" having similar semantics to the application software "App N" respectively.

In some embodiments, the generated augmented samples may be obtained by adding the second feature dimension with similar semantics to the first feature dimension. Specifically, for the first feature dimension with the value and the second feature dimension with the second value in the sample data, since the first feature dimension and the second feature dimension have similar semantics, the value of the second feature dimension is set to the first value, the value of the first feature dimension is kept unchanged, and the values of other feature dimensions of the first sample data and the label corresponding to the first sample data are kept unchanged, so that the augmented samples, that is, the second sample data are obtained.

FIG. 3 shows an example of obtaining the augmented samples through the enhancement method of replacement. As shown in an augmented sample 2 in FIG. 3, in a real sample, the sample user has installed Loan App 1 but not installed Loan App 2, that is, "Loan App 1" is the first feature dimension in the sample data, "Loan App 2" is the second feature dimension in the sample data, and "Loan App 1" and "Loan App 2" are semantically similar. To generate the augmented samples by adding, while keeping the sample label unchanged, the feature value of the feature "Loan App 1" may be kept unchanged, and the feature value of the feature "Loan App 2" may be set to be 1, so that the feature "Loan App 2" is added in the real sample to obtain the augmented sample 2. Similarly, a plurality of second feature dimensions may be added at the same time, and the operation is similar to the above operation, which will not be repeated here.

In some embodiments, the second feature dimension having similar semantics to the first feature dimension may be obtained by using the unsupervised semantic representation model as shown in FIG. 4. The specific operation is similar to the above operation, which will not be repeated here.

In some embodiments, the first sample data may be obtained by sampling the sample data set randomly. It can be understood that a manner of selecting the first sample data may be selected according to the actual situation, which is not limited here.

In some embodiments, the data processing method may further include: in response to determining that the number of sample data, with the feature values of the first feature dimensions being the first values, in the sample data set exceeds a threshold, third sample data are selected from the number of sample data; feature values of the first feature dimensions of the third sample data are changed to the second values to generate fourth sample data; and the fourth sample data are added to the sample data set.

When the ratio of sample data with the first feature dimensions being the first values to the total sample data in the sample data set is too high, for example, in the user behavior sample data set, 80% of users have values for the feature "whether App A is installed" the first feature dimensions may have too much influence on the model when the sample data set is used for model training, and the model may ignore other feature dimensions with lower ratios.

Therefore, for the sample data with an excessively high ratio of the first feature dimensions, that is, the third sample data, the first feature dimensions of part of the third sample data may be masked, that is, the values of the first feature dimensions are set to the second values, and values of other feature dimensions of the third sample data and labels corresponding to the third sample data are kept unchanged, and the sample data with the first feature dimensions being masked are used as augmented samples, that is, the fourth sample data. By adding the fourth sample data to the sample data set, the problem that the first feature dimension has a great influence on the model can be solved, and thus the effect of the model is improved.

FIG. 3 shows an example of obtaining the augmented samples through the enhancement method of replacement. As shown in an augmented sample 3 in FIG. 3, in the real sample, the sample user has installed Search App 1, that is, "Search App 1" is the first feature dimension in the sample data. In the case of keeping the sample label unchanged, the purposes of deleting the feature "Search App 1" from the real sample to obtain the augmented sample 3 may be realized by setting the feature value of the feature "Search App 1" to be 0. Similarly, the plurality of first feature dimensions may be deleted at the same time, and the operation is similar to the above operation, which will not be repeated here.

In some embodiments, the third sample data are selected from the plurality of pieces of sample data randomly.

Optionally, a corresponding sampling probability may be obtained based on the ratio of the first feature dimensions, and the sample data set may be sampled randomly based on the sampling probability, so as to obtain the sample data with the first feature dimensions needing to be masked.

According to some embodiments, for a plurality of sets of first feature dimensions and second feature dimensions with similar semantics, one or more of the above methods such as adding, replacing and masking can be used simultaneously to obtain a plurality of augmented samples.

By using the sample data set added with the augmented samples for model training, the effect of the model can be improved to a certain extent. For example, in an application scenario of binary classification, the effect of the model is generally measured by an AUC value (the area enclosed by the ROC curve and the coordinate axis) and a KS value (obtained by the K-S test). By using the sample data set obtained in one or more embodiments of the present disclosure, the AUC value of the obtained model may be increased by 1-2%, and the KS value may be increased by 2-3%.

Figure 5:
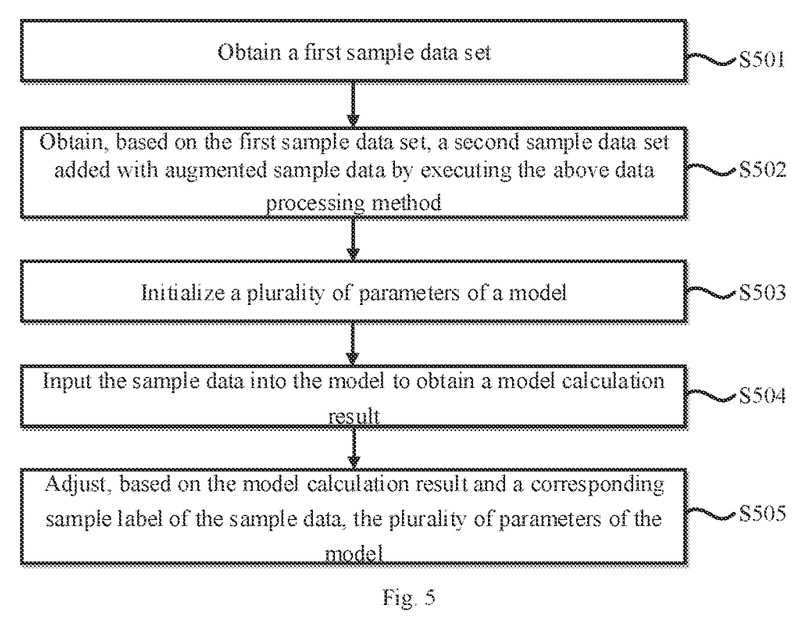
FIG. 5 shows a flowchart of a model training method according to some embodiments of the present disclosure.

According to some embodiments, as shown in FIG. 5, a model training method is provided. The model training method includes: step S501, a first sample data set is obtained; step S502, a second sample data set added with augmented sample data is obtained based on the first sample data set by executing the above data processing method, where each piece of sample data in the second sample data set includes a corresponding sample label; step S503, a plurality of parameters of a model are initialized; and the following operation is performed on each piece of sample data in the second sample data set: step S504, the sample data are input into the model to obtain a model calculation result; and step S505, the plurality of parameters of the model are adjusted based on the model calculation result and the corresponding sample label of the sample data.

Through the embodiment of the present disclosure, by replacing corresponding features in the sample data with semantically similar features or adding the semantically similar features to generate augmented samples, and adding the augmented samples to the original sample data set, the sample size of the sample data set is increased. By performing model training based on the updated sample data set, the training effect of the model can be further improved, and the robustness of the model can be enhanced.

Figure 6:
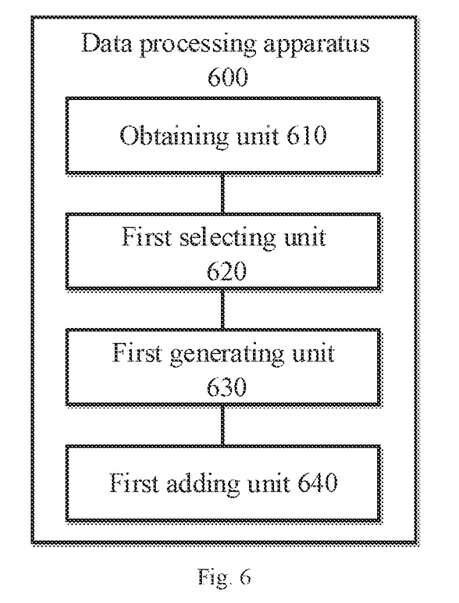
FIG. 6 shows a structural block diagram of a data processing apparatus according to some embodiments of the present disclosure.

According to some embodiments, as shown in FIG. 6, a data processing apparatus 600 is provided. The data processing apparatus includes an obtaining unit 610, configured to obtain a sample data set for modeling, where each piece of sample data in the sample data set at least includes a first feature dimension and a second feature dimension; a first selecting unit 620, configured to select first sample data from the sample data set, where feature values of the first feature dimensions of the first sample data are first values, and feature values of the second feature dimensions of the first sample data are second values; a first generating unit 630, configured to generate, in response to determining that a similarity between a first semantic vector corresponding to the first feature dimension and a second semantic vector corresponding to the second feature dimension meets a preset condition, second sample data based on the first sample data, where feature values of the second feature dimensions of the second sample data are the first values, and where the second sample data and the first sample data have the same sample label; and a first adding unit 640, configured to add the second sample data to the sample data set.

The operations of the units 610 to 640 in the data processing apparatus 600 are similar to the operations of the steps S201 to S204 in the above data processing method, which will not be repeated here.

According to some embodiments, feature values of the first feature dimensions of the second sample data are the second values.

According to some embodiments, the feature values of the first feature dimensions of the second sample data are the first values.

According to some embodiments, the data processing apparatus may further include: a second selecting unit, configured to select, in response to determining that the number of sample data, with the feature values of the first feature dimensions being the first values, in the sample data set exceeds a threshold, third sample data from the plurality of pieces of sample data; a second generating unit, configured to change feature values of the first feature dimensions of the third sample data to the second values to generate fourth sample data; and a second adding unit, configured to add the fourth sample data to the sample data set.

According to some embodiments, the third sample data are selected from the plurality of pieces of sample data randomly.

Figure 7:
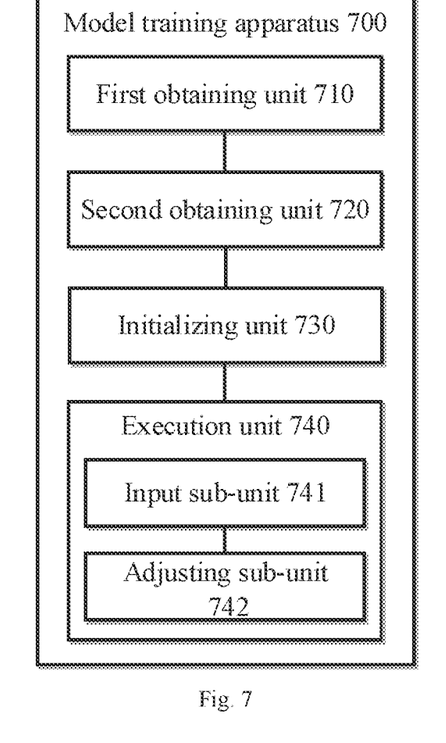
FIG. 7 shows a structural block diagram of a model training apparatus according to some embodiments of the present disclosure.

According to some embodiments, as shown in FIG. 7, a model training apparatus 700 is provided. The model training apparatus includes: a first obtaining unit 710, configured to obtain a first sample data set; a second obtaining unit 720, configured to obtain, based on the first sample data set, a second sample data set added with augmented sample data by executing the above data processing method, where each piece of sample data in the second sample data set includes a corresponding sample label; an initializing unit 730, configured to initialize a plurality of parameters of a model; and an execution unit 740, configured to execute operation of the following sub-units on each piece of sample data in the second sample data set. The execution unit 740 includes: an input sub-unit 741, configured to input the sample data into the model to obtain a model calculation result; and an adjusting sub-unit 742, configured to adjust, based on the model calculation result and the corresponding sample label of the sample data, the plurality of parameters of the model.

The operations of the units 710 to 740 and the sub-units 741 and 742 in the model training apparatus 700 are similar to the operations of the steps S501 to S505 in the above model training method, which will not be repeated here.

In the technical solutions of the present disclosure, the collection, storage, use, processing, transmission, provision, and disclosure of involved personal information of the user are all in compliance with relevant laws and regulations, and do not violate public order and good customs.

According to some embodiments of the present disclosure, an electronic device, a readable storage medium and a computer program product are further provided.

Figure 8:
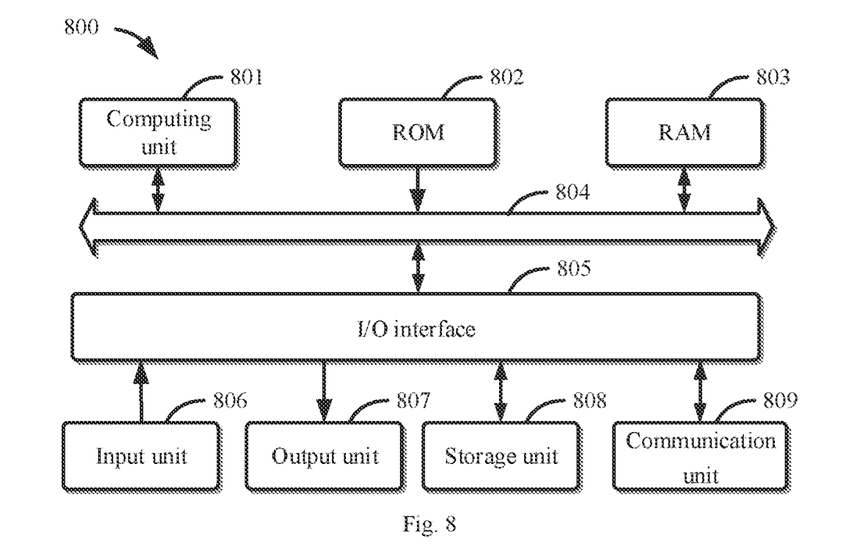
FIG. 8 shows a structural block diagram of an example electronic device that can be configured to implement embodiments of the present disclosure.

Referring to FIG. 8, a structural block diagram of an electronic device 800 that may serve as a server or a client of the present disclosure will now be described, and the electronic device is an example of a hardware device that may be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cell phone, a smart phone, a wearable device and other similar computing apparatuses. The components shown herein, their connections and relationships, and their functions are merely used as examples, and are not intended to limit the implementations of the present disclosure described and/or required herein.

As shown in FIG. 8, the device 800 includes a computing unit 801 that may perform various appropriate actions and processing according to computer programs stored in a read-only memory (ROM) 802 or computer programs loaded from a storage unit 808 into a random access memory (RAM) 803. Various programs and data required for operations of the device 800 may further be stored in the RAM 803. The computing unit 801, the ROM 802 and the RAM 803 are connected to each other via a bus 804. An input/output (I/O) interface 805 is also connected to the bus 804.

A plurality of components in the device 800 are connected to the I/O interface 805, including: an input unit 806, an output unit 807, a storage unit 808, and a communication unit 809. The input unit 806 may be any type of device capable of inputting information to the device 800. The input unit 806 may receive input digital or character information and generate key signal input related to user settings and/or function control of the electronic device, and may include but not limited to a mouse, a keyboard, a touch screen, a trackpad, a trackball, a joystick, a microphone and/or a remote control. The output unit 807 may be any type of device capable of presenting information, and may include but not limited to a display, a speaker, a video/audio output terminal, a vibrator and/or a printer. The storage unit 808 may include, but not limited to, a magnetic disk and a compact disk. The communication unit 809 allows the device 800 to exchange information/data with other devices via computer networks such as the Internet and/or various telecommunication networks, and may include, but not limited to, a modem, a network card, an infrared communication device, a wireless communication transceiver and/or a chipset, such as a Bluetooth™ device, a 802.11 device, a WiFi device, a WiMax device, a cellular communication device and/or the like.

The computing unit 801 may be various general-purpose and/or special-purpose processing components with processing and computing capabilities. Some examples of the computing unit 801 include but not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 801 performs various methods and processing described above, such as the data processing method or the model training method. For example, in some embodiments, the data processing method or the model training method may be implemented as a computer software program that is tangibly included in a machine-readable medium, such as the storage unit 808. In some embodiments, part or all of the computer programs may be loaded and/or installed onto the device 800 via the ROM 802 and/or the communication unit 809. When the computer programs are loaded into the RAM 803 and executed by the computing unit 801, one or more steps of the data processing method or the model training method described above may be performed. Alternatively, in other embodiments, the computing unit 801 may be configured to perform the data processing method or the model training method in any other suitable manner (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally far away from each other and usually interact via a communication network. The relationship between the client and the server is generated by computer programs running on the corresponding computer and having a client-server relationship with each other. The server may be a cloud server, or a server of a distributed system, or a server combined with a block chain.

It should be understood that the various forms of processes shown above may be used to reorder, add, or delete steps. For example, the steps recorded in the present disclosure may be performed in parallel, sequentially or in different orders, as long as the desired results of the technical solution disclosed by the present disclosure can be achieved, which is not limited herein.

Although the embodiments or examples of the present disclosure have been described with reference to the accompanying drawings, it should be understood that the above methods, systems and devices are only example embodiments or examples, and the scope of the present disclosure is not limited by these embodiments or examples, but only by the authorized claims and their equivalent scope. Various elements in the embodiments or examples may be omitted or replaced by their equivalent elements. In addition, the steps may be performed in an order different from that described in the present disclosure. Further, various elements in the embodiments or examples may be combined in various ways. It is important that as technology evolves, many of the elements described herein may be replaced by equivalent elements that appear after the present disclosure.

The invention claimed is:

1. A data processing method, comprising:
obtaining a sample data set for modeling, wherein each piece of sample data in the sample data set comprises at least a first feature dimension and a second feature dimension;
selecting a first sample data from the sample data set, wherein a feature value of the first feature dimension of the first sample data is a first value, and the feature value of the second feature dimension of the first sample data is a second value;
generating, in response to determining that a similarity between a first semantic vector corresponding to the first feature dimension and a second semantic vector corresponding to the second feature dimension meets a preset condition, a second sample data based on the first sample data, wherein the feature value of the second feature dimension of the second sample data is the first value, and wherein the second sample data and the first sample data have a same sample label;
adding the second sample data to the sample data set;
selecting, in response to determining that a number of a plurality of pieces of sample data in the sample data set with the feature value of the first feature dimension being the first value exceeds a threshold, a third sample data from the plurality of pieces of sample data;
changing the feature value of the first feature dimension of the third sample data to the second value to generate a fourth sample data; and
adding the fourth sample data to the sample data set.

2. The method according to claim 1, wherein the feature value of the first feature dimension of the second sample data is the second value.

3. The method according to claim 1, wherein the feature value of the first feature dimension of the second sample data is the first value.

4. The method according to claim 1, wherein the third sample data is selected from the plurality of pieces of sample data randomly.

5. The method according to claim 1, wherein the sample data set is used for training a model, and the process of the training the model comprises:
initializing a plurality of parameters of the model; and
executing following operations on each piece of sample data in the sample data set:
inputting that sample data into the model to obtain a model calculation result; and
adjusting, based on the model calculation result and a sample label corresponding to that sample data, the plurality of parameters of the model.

6. An electronic device, comprising:
one or more processors; and
a memory storing one or more programs configured to be executed by the one or more processors, the one or more programs comprising instructions for performing operations comprising:
obtaining a sample data set for modeling, wherein each piece of sample data in the sample data set comprises at least a first feature dimension and a second feature dimension;
selecting a first sample data from the sample data set, wherein a feature value of the first feature dimension of the first sample data is a first value, and the feature values of the second feature dimension of the first sample data is a second value;
generating, in response to determining that a similarity between a first semantic vector corresponding to the first feature dimension and a second semantic vector corresponding to the second feature dimension meets a preset condition, a second sample data based on the first sample data, wherein the feature value of the second feature dimension of the second sample data is the first value, and wherein the second sample data and the first sample data have a same sample label;
adding the second sample data to the sample data set;
selecting, in response to determining that a number of a plurality of pieces of sample data in the sample data set with the feature value of the first feature dimension being the first value exceeds a threshold, a third sample data from the plurality of pieces of sample data;
changing the feature value of the first feature dimension of the third sample data to the second value to generate a fourth sample data; and
adding the fourth sample data to the sample data set.

7. The electronic device according to claim 6, wherein the feature value of the first feature dimension of the second sample data is the second value.

8. The electronic device according to claim 6, wherein the feature value of the first feature dimension of the second sample data is the first value.

9. The electronic device according to claim 6, wherein the third sample data is selected from the plurality of pieces of sample data randomly.

10. The electronic device according to claim 6, wherein the sample data set is used for training a model, and the process of the training the model comprises:
 initializing a plurality of parameters of the model; and
 executing a following operations on each piece of sample data in the sample data set:
  inputting that sample data into the model to obtain a model calculation result; and
  adjusting, based on the model calculation result and a sample label corresponding to that sample data, the plurality of parameters of the model.

11. A non-transitory computer-readable storage medium storing one or more programs comprising instructions that, when executed by one or more processors of a computing device, cause the computing device to perform operations comprising:
 obtaining a sample data set for modeling, wherein each piece of sample data in the sample data set comprises at least a first feature dimension and a second feature dimension;
 selecting a first sample data from the sample data set, wherein a feature value of the first feature dimension of the first sample data is a first value, and the feature values of the second feature dimension of the first sample data is a second value;
 generating, in response to determining that a similarity between a first semantic vector corresponding to the first feature dimension and a second semantic vector corresponding to the second feature dimension meets a preset condition, a second sample data based on the first sample data, wherein the feature value of the second feature dimension of the second sample data is the first value, and wherein the second sample data and the first sample data have a same sample label;
 adding the second sample data to the sample data set;
 selecting, in response to determining that a number of a plurality of pieces of sample data in the sample data set with the feature value of the first feature dimension being the first value exceeds a threshold, a third sample data from the plurality of pieces of sample data;
 changing the feature value of the first feature dimension of the third sample data to the second value to generate a fourth sample data; and
 adding the fourth sample data to the sample data set.

12. The computer-readable storage medium of claim 11, wherein the feature value of the first feature dimension of the second sample data is the second value.

13. The computer-readable storage medium of claim 11, wherein the feature value of the first feature dimension of the second sample data is the first value.

14. The computer-readable storage medium of claim 11, wherein the third sample data is selected from the plurality of pieces of sample data randomly.

15. The computer-readable storage medium of claim 11, wherein the sample data set is used for training a model and the process of the training the model comprises:
 initializing a plurality of parameters of the model; and
 executing a following operations on each piece of sample data in the sample data set:
  inputting that sample data into the model to obtain a model calculation result; and
  adjusting, based on the model calculation result and a sample label corresponding to that sample data, the plurality of parameters of the model.

\* \* \* \* \*